Figure 5:
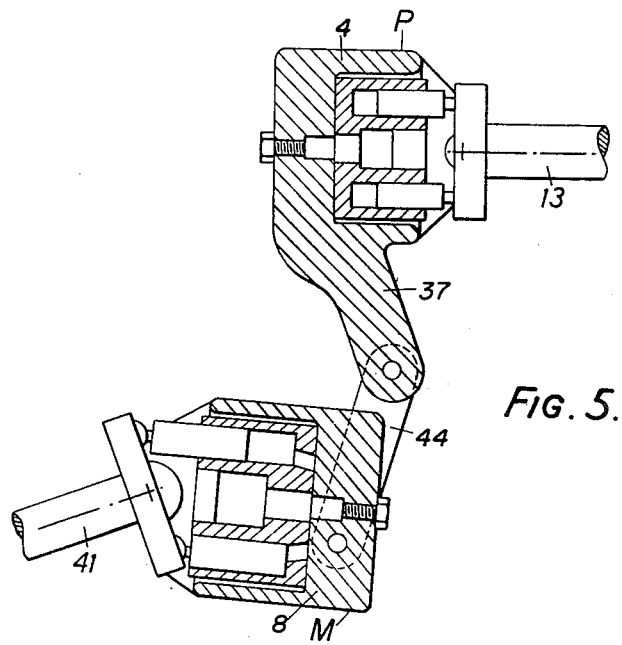

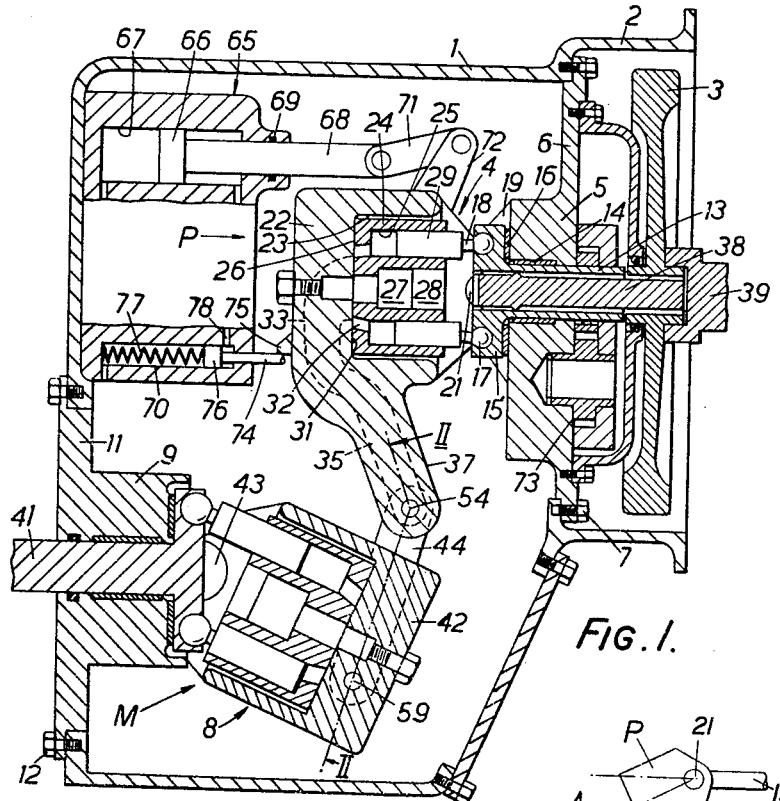

Jan. 5, 1965  G. H. DOWTY ETAL  3,163,987
HYDROSTATIC POWER TRANSMISSION

Filed June 21, 1963  3 Sheets-Sheet 2

INVENTOR
George H. Dowty
Thomas A.H. Andrews
By
Reynolds + Christensen
ATTORNEY

Jan. 5, 1965  G. H. DOWTY ETAL  3,163,987
HYDROSTATIC POWER TRANSMISSION
Filed June 21, 1963  3 Sheets-Sheet 3

INVENTOR
George H. Dowty
Thomas D. H. Andrews
By
Reynolds + Christensen
ATTORNEY United States Patent Office 3,163,987
Patented Jan. 5, 1965

3,163,987
HYDROSTATIC POWER TRANSMISSION
George H. Dowty and Thomas D. H. Andrews, near Cheltenham, England, assignors to Dowty Technical Developments Limited, Brockhampton Park, near Andoversford, England, a British company
Filed June 21, 1963, Ser. No. 289,601
Claims priority, application Great Britain, June 22, 1962, 24,047/62; May 4, 1963, 17,724/63
11 Claims. (Cl. 60—53)

This invention relates to a hydraulic power transmission which comprises a variable positive displacement hydraulic pump in hydraulic connection with a variable positive displacement hydraulic motor, the pump being adapted to receive power from a power source and the motor being adapted to deliver power to a load, the speed ratio between pump and motor speeds being determined by the relative displacements of the pump and the motor.

The present invention is concerned with a hydraulic power transmission having a pump and a motor each of the tilting head kind and each comprising a drive flange tightly secured to or integral with a fixedly positioned rotary drive shaft and a head tiltable about a tilt axis relatively to the drive flange. The head comprises a frame or casing containing a rotary cylinder block, a rotary drive means between the drive flange and the cylinder block, and pistons associated with the cylinder block and arranged for reciprocation whenever the cylinder block is tilted relatively to the drive flange during rotation of the drive flange and cylinder block. The tilt angle of the head relatively to the rotation axis of the drive flange determines the effective stroke of the pistons in their cylinders. A valve means containing a pair of ports is used for the supply-and-return of liquid to and from the cylinders. A pump or a motor of the kind set forth in this paragraph will, for convenience, be referred to hereafter as "a tilting head pump" or a "tilting head motor."

In accordance with the present invention a power transmission comprises a tilting head pump and a tilting head motor arranged with their tilt axes in substantially parallel relationship and with the drive shafts of pump and motor non-coaxially arranged, a lever forming part of one of the tilting heads, and a link pivotally connected at spaced positions along its length to the lever and to the other tilting head, whereby adjustment of the pump tilting head about its tilt axis will cause adjustment of the motor tilting head about its tilt axis. The lever and the link may each include a passage for hydraulically connecting the pump and the motor, but this is not essential, and the hydraulic interconnection may be accomplished otherwise, At one angular position of the pump tilting head (referred to as the dead centre position, wherein the pump head's rotative axis coincides with the axis of its drive shaft) the link pivots are aligned with the pump tilt axis, according to this invention, to determine the maximum angular movement of the motor tilting head about its tilt axis and the maximum piston stroke position. By "aligned" we mean that a straight line can be drawn which intersects the pump tilt axis and the two pivot axes of the link.

The relative arrangement of the tilting head pump and the tilting head motor may be such that there will be a plane perpendicular to the pump drive shaft axis which will pass through both the pump and motor tilting heads and there will be a plane perpendicular to the motor drive shaft axis which will also pass through both the pump and motor tilting heads.

The motor tilting head may lie to one side of the plane passing through the pump drive shaft and tilt axes and the lever may form part of the pump tilting head, exending towards the motor tiling head.

It may be pointed out here that this invention is related to the inventions disclosed in application Serial No. 230,893, filed October 16, 1962 in the name of Oswald Thoma, and in application Serial No. 255,256, filed January 31, 1963 in the names of said Thoma and Edward V. Ward. The first-mentioned application is directed primarily to the arrangement wherein the link that interconnects the pump unit and the motor unit comes into alignment with the tilting axis of the pump when the pump unit is in zero displacement position. The second-mentioned application is characterized in that the drive shaft axes of the pump unit and the motor unit are non-coaxial, being parallel, inclined, or skewed. The characteristic feature of this present invention is that the link is pivotally connected directly to one tilting head, and to the other tilting head through the medium of a lever secured to and rigid with that other head.

Figure 6:
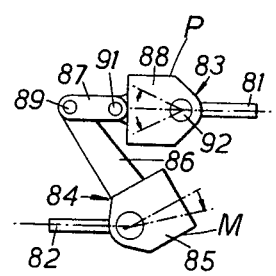
Figure 7:
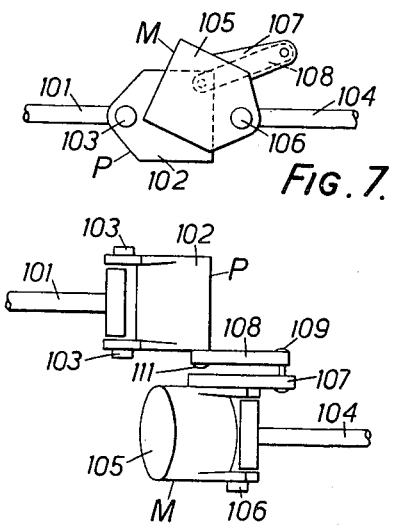
Figure 8:
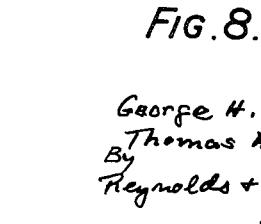
Figure 9:
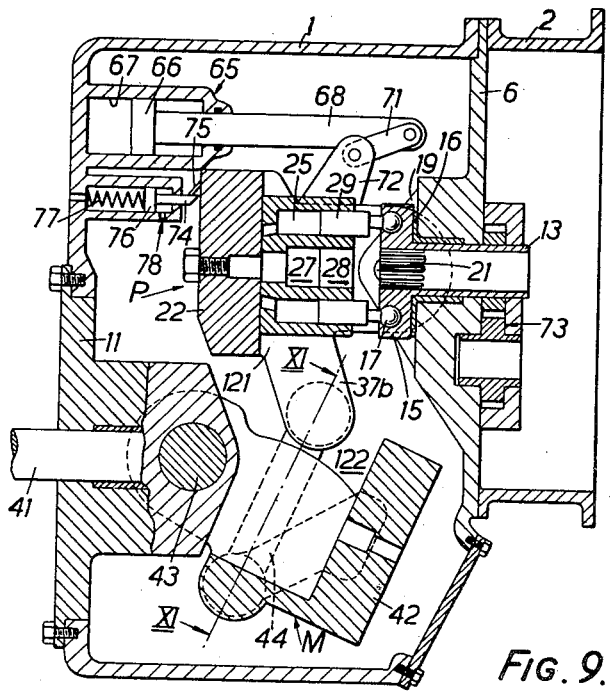
Figure 10:
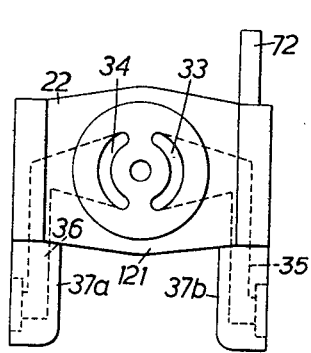
Figure 11:
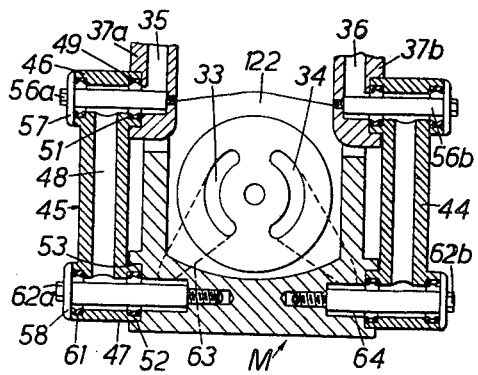

Five embodiments of the invention will now be described with reference to the accompanying drawings, in which, FIGURE 1 is a cross-section through the first embodiment, FIGURE 2 is a cross-section on the line II—II of FIGURE 1, FIGURES 3 and 4 are diagrammatic views showing the limits of movement of the pump and motor heads of FIGURE 1, FIGURES 5 and 6 are diagrammatic views of the second and third embodiments of the invention, FIGURES 7 and 8 are diagrammatic elevation and plan respectively of the fourth embodiment of the invention, FIGURE 9 is a cross-section through the fifth embodiment, FIGURE 10 is an end view of the pump yoke of FIGURE 9, and, FIGURE 11 is a cross-section on the line XI—XI of FIGURE 9.

The embodiment shown in FIGURES 1 and 2 is particularly intended for use as a power transmission on a vehicle to transmit power from the vehicle engine to the ground engaging wheels. The transmission is contained within a hollow container 1 which is designed to be secured directly to the vehicle engine by means of a bell-shaped housing 2 forming an extension from the container 1. Within this bell-housing 2 the engine flywheel 3 is conveniently located. The transmission pump unit 4 (also designated P) is mounted within the container by means of a bearing housing 5 forming part of a flange 6 secured in position by bolts 7 to form part of the container 1. The motor unit 8 (also designated M) is secured in position within the casing by means of a bearing housing 9 forming part of a flange 11. The flange 11 is secured by bolts 12 to form part of the container 1.

The pump and motor units 4 and 8 are generally of similar construction and the pump unit 4 only will be described in detail. The pump drive shaft 13 is carried by a bearing 14 within the bearing housing 5. The inner end of the drive shaft 13 is integrally formed with a drive flange 15 which bears against a bearing surface 16 of the bearing housing 5 for the absorption of end-thrust. Within the flange 15 a plurality of ball joints 17 are located whose centres lie on a circle co-axial with the drive shaft 13. From these ball joints connecting rods 18 extend. Also forming part of the bearing housing are a pair of lugs 19 having co-axial trunnions 21 whose axis forms a diameter of the circle including the centres of the ball joints 17.

From the trunnions 21 the pump head casing 22 is pivotally mounted so as to be capable of tilt movement about the axis of the trunnions 21. A recess 23 within the casing 22 accommodates the rotary cylinder block 24. This cylinder block includes a plurality of cylinders 25 located around the cylinder block at equally-spaced intervals and having their axes parallel to the axis of cylinder block rotation. The cylinder block 24 is mounted for rotation on a flat valve plate 26 formed as an integral part of the casing 22 at the bottom of the recess 23. A central pin 27 extending from the valve plate 26 enters into a central bore 28 of the cylinder block to locate it in position for rotation on the valve plate 26.

Within each cylinder 25 a piston 29 is mounted for reciprocating movement. Each piston includes a deep bore to receive the end of the associated connecting rod 18. The inner end of each connecting rod 18 is of part-spherical shape to fit a recess within the piston. The connecting rod is locked within the bore by any suitable means so as to prevent the connecting rod from leaving the piston. At the same time the locking is such as to permit slight angular movement only of the connecting rod within the bore in the piston. The purpose of such slight angular movement is to cause the connecting rods during rotation to engage the sides of the piston bores so that rotational drive is transmitted from the drive flange 15 to the cylinder block 24. Any other suitable means to drive the cylinder block rotationally from the drive flange might be employed.

The face 31 of the cylinder block making contact with the valve plate 26 includes a plurality of regularly-spaced ports 32 extending to the face 31 from the cylinder 25. Within the valve plate 26 a pair of kidney-shaped ports 33 and 34 are provided from which passages 35 and 36 extend through the wall of casing 22 into a lever 37 extending from one side of the casing 22.

It will be seen that the casing 22 and the enclosed cylinder block 24 together form a tilting head which may be tilted about the tilt axis formed by the axis of the trunnions 21.

The pump drive shaft 13 is hollow and includes at its inner end a splined connection for engagement by a shaft 38 extending from fly-wheel 3. At its other end the shaft 38 is engaged also by a spline in the fly-wheel 3. The function of the two splines is to accommodate very slight mis-alignment which might occur between the pump drive shaft 13 and the engine output shaft 39, when the engine is secured to the container 1 by means of the bell-housing 2.

Rotation of the drive shaft 13 will cause rotation of the cylinder block 24 by engagement of the connecting rods 18 in the piston bores. Assuming that the head of the pump is tilted in the trunnions 21 so that the cylinder block axis is inclined to the drive shaft axis, the pistons 29 will be reciprocated within their cylinders during cylinder block rotation and this will cause liquid flow through the ports 33 and 34. The direction of displacement of liquid will depend on the direction in which the pump head is tilted about the trunnion axis from the head's zero displacement position in which the cylinder block is co-axial with the flange 15.

As previously mentioned, the motor 8 is of substantially similar construction to the pump 4 but it has no lever corresponding to lever 37. The motor drive shaft 41 is carried in bearings within the bearing housing 9 and includes an integrally formed drive flange. The rotary cylinder block is carried in a casing 42 tiltable about trunnions 43 carried by lugs extending from the bearing housing 9. As with the pump the casing 42 includes a rotary cylinder block having pistons reciprocated by connecting rods extending to ball joints in the drive flange.

The pump and motor heads are interconnected by a pair of similar parallel links 44 and 45 as shown more particularly in FIGURE 2. These links are connected pivotally between the lever 37 and the valve plate end of the casing 42. The link 45 is shown in cross-section and comprises a pair of transversely bored end portions 46 and 47 interconnected by a tube 48. The end portion 46 includes a boss 49 which fits accurately for pivotal movement in a recess 51 in the end of lever 37 whilst the end portion 47 includes a boss 52 which fits accurately for pivotal movement within a recess 53 in the side of the casing 42. The end portion 46 is retained in position with the boss engaging the recess 51 by means of a flange 57 held by a bolt 54, a tubular spacer 55 and a nut 56. The end portion 47 is held in position in the recess 52 by means of a flange 58 locked in position by a bolt 59, a tubular spacer 61 and a nut 62 on the valve-plate portion of the casing 42. Within the valve plate end of the casing 42 a passage 63 extends from the recess 53 to the kidney port 33 of the motor. A hydraulic passage thus exists between the kidney port 33 of the pump and the kidney port 33 of the motor through the lever and the link 45. In a similar manner a hydraulic passage exists from the pump kidney port 34 to the motor kidney port 34, through the lever 37 and the link 44.

The mountings of pump 4 and motor 8 are such that the axes of the trunnions 21 and 43 are parallel to one another. The links 44 and 45 extend between two pivotal axes which extend along the axis of the bolts 54 and 59. These pivotal axes are necessarily parallel to one another and to the axes of trunnions 21 and 43. The links 44 and 45, since they extend between the two parallel pivotal axes, act mechanically as one link although in the hydraulic sense they provide two separate hydraulic passages between the pump and motor.

The pump and motor 4 and 8 lie in a side-by-side relation, in that a plane perpendicular to the axis of the pump drive shaft 13 will pass through pump and motor heads and also a plane perpendicular to the motor drive shaft 41 will also pass through the pump and motor heads. With this side-by-side arrangement the provision of the lever 37 and the link 44 enables a dead-centre relationship to be obtained between angular tilt movements of pump head and the motor head. As shown in FIGURE 1 the pump head is in the zero displacement position in which the axes of the cylinder block 24 and the drive flange 15 are coincident. In this condition rotation of the drive flange and the cylinder block will produce no reciprocation of the pistons within their cylinders and thus no displacement of liquid. In this zero displacement position of the pump it is arranged that the pivot axes of the link indicated by the axes of the bolts 54 and 59 are substantially aligned with the axis of trunnions 21 thus ensuring that the axis of bolt 59 is displaced to the farthest distance permitted by the link from the trunnions 21. It is arranged that this will determine a maximum angular displacement of the motor head at which the motor pistons will have their maximum stroke during the rotation of the motor cylinder block and drive flange.

For the purpose of adjusting tilt angles of the pump and motor heads a servo motor 65 is provided comprising a piston 66 movable under hydraulic pressure within a cylinder 67. From the piston 66 a connecting rod 68 extends, and a seal 69 in the end of cylinder 67 through a pivoted link 71 connects rod 68 to an arm 72 extending from the pump head. It will be noted that such a servo-motor sets limits to the tilting of the pump head from its position of zero displacement. The method of controlling the servo motor forms no part of the present invention. FIGURES 3 and 4 represent the two extremes of adjustment of the pump head. In FIGURE 3 the pump head P has been moved through a maximum angle A to give forward displacement and this movement has resulted in a reduction of the maximum angle of the motor head M by an amount B. The amount B is arranged so that the motor displacement is substantially reduced but its direction is not reversed. For example, the angle A may be 25° and the angle B may be 15°. The maximum angle of the motor head as shown in FIGURE 1 is 25°.

In the condition as shown in FIGURE 1 the transmission is in a neutral position since rotation of the pump drive shaft will not cause displacement of liquid and the motor will therefore not be driven. Small displacement of the pump tilting head will cause little or no reduction of motor head tilt angle and the pump will then pump a small flow rate of liquid at substantial pressure. This will be converted at the motor into a slow rotation of the motor drive shaft with a large driving torque. Increase in the angle of the pump head will increase the flow rate of liquid and at the same time reduce the motor displacement, increasing the speed of the motor drive shaft 41 in the forward direction. For reverse operation the pump head P is moved upwardly by the servo motor as seen in the drawings, the limit of upward movement being indicated by the angle C in FIGURE 4. In this condition the motor head M will have been reduced by an angle indicated at D. Under these conditions since the displacement of the pump is reversed the motor drive shaft will be rotated in the reverse direction. A considerable range of speed and torque at the motor drive shaft is obtainable both in the forward and reverse directions by adjustment of the tilt angle of the pump head, which in turn results also in adjustments of the angle of the motor head.

For the purpose of maintaining the transmission formed by pump 4 and motor 8 primed with liquid a low pressure make-up pump 73 is located within the bearing housing 5 to be driven by the pump drive shaft 13. The pump 73, as shown, comprises a simple gear pump. The liquid delivered by the make-up pump 73 may be fed into the transmission by conventional valves, which may be located, for example, in the pump or the motor head casings. The delivery from the make-up pump 73 may also be used to actuate the servo motor 65.

When the transmisison illustrated is in use the pump liquid delivered by the make-up pump 73 may be fed vertical plane about their tilt axes. When the transmission is not in use and no pressure is generated by the make-up pump 73 to supply power to the servo motor 65 the pump and motor heads will fall into the position illustrated in FIGURE 3. This is extremely disadvantageous in that on starting the engine the transmisison would impose a large drag by tending to cause propulsion of the vehicle. To prevent this difficulty a latch is provided comprising a bolt 74 engageable with a small lug 75 on the pump head casing. The bolt 74 can project from one end of a cylinder 70 and within this cylinder is attached to a piston 76. A spring 77 loads the piston 76 to the position where bolt 74 engages the lug 75. A hydraulic passage 78 carries hydraulic liquid from the make-up pump 73 to that end of the cylinder 70, which will withdraw the bolt 74 from engagement with lug 75, against the loading of spring 77, during operation of the transmission. Whenever the engine driving the transmission is stopped the loss of pressure from the make-up pump will permit the bolt 74 to move outwardly under the load of spring 77. If the stopping is intentional the pump will be in zero displacement position, and bolt 74 will engage the lug 75 to prevent falling of the pump and motor heads. Only should the engine stall under overload will parts be other than in the zero pump displacement position. Should this occur, the transmission can be unloaded by means of a conventional unloading valve (not shown). This will prevent build-up of high pressure as the pump is rotated, although it does permit imposition of substantial drag upon the engine. Having started the engine, the servo motor 65 is provided with power by the make-up pump 73 to enable the pump head to be tilted to an appropriate position, and bolt 74 is withdrawn.

In the embodiment of FIGURES 1, 2, 3 and 4 the pump and motor drive shafts are non-coaxial in the sense that they are in parallel relation. In the example shown diagrammatically in FIGURE 5 the construction is exactly as described for FIGURE 1 with the exception that the pump and motor drive shafts 13 and 41 are now inclined to one another by a small angle and their axes intersect. This angle is such that the pump and motor are still in a side-by-side relationship.

In the two embodiments described in FIGURES 1 to 5, the arrangement is such that the pump head carries the lever from which the link extends to the motor head. FIGURE 6 illustrates an alternative arrangement also within the scope of the present invention in which the lever is carried by the motor head and the link extends from the lever to the pump head. In FIGURE 6 the pump drive shaft 81 and the motor drive shaft 82 are arranged in parallel relationship, although as a FIGURE 5 they might be inclined, and the pump and motor 83 and 84 are in side-by-side relationship. The motor head 85 has lever 86 extending to one side and from the end of the lever 86 a pivoted link 87 extends to the pump head 88. The pivot axes 89 and 91 of the link are aligned with the trunnion axis 92 of the pump in the dead-centre position which, in this instance, corresponds to the zero piston stroke position of the pump. Movement of the pump head 88 in either direction about its tilt axis 92 from the position indicated will result in reduction of tilt angle of the motor head 85. Thus in the dead-centre position illustrated the link 87 holds the motor at its maximum displacement position.

The three embodiments of the invention described with reference to FIGURES 1 to 6 all show the transmission where the side-by-side arrangement of pump and motor is such that tilting movement of pump and motor heads can take place in a common plane. The side-by-side arrangement of pump and motor can also be such that the pump and motor heads are laterally spaced one from the other so that the heads swing in parallel planes. Such an arrangement is shown in the fourth embodiment illustrated in FIGURES 7 and 8. In this embodiment the pump comprises a drive shaft 101 and a tilting head 102 carried on trunnions 103. The motor comprises the drive shaft 104 and the tilting head 105 carried on trunnions 106. The lateral displacement may be particularly appreciated from the plan view in FIGURE 8. In this case the lever 107 is mounted on motor head 105 and the link 108 is secured by pivots 109 and 111 between the end of the lever 107 and the pump head 102. The arrangement of the pivots 108 and 111 is such that in the zero displacement position of the pump illustrated, the link pivots are aligned with the axis of pump trunnions 103. This arrangement will give a range of forward and reverse transmission speed ratio as described in connection with the first embodiment.

The link and the lever may provide the hydraulic interconnection between the pump and motor as shown in FIGURE 1, or alternatively, the link and the lever may perform only the mechanical function of interconnecting the pump and motor heads, the hydraulic connection being provided in a more conventional manner, for example, by hydraulic passages through the trunnions of the pump and motor heads.

Reference is now made to the fifth embodiment of the invention illustrtaed in FIGURES 9, 10 and 11. This embodiment is a modification of the embodiment described with reference to FIGURES 1 and 2. Similar reference numerals used in the first and the fifth embodiments will refer to similar parts in these embodiments. The main difference of the fifth embodiment from the first embodiment is that the pump and motor head casings 22 and 42 have been brought considerably closer together to form the whole transmisison into a more compact unit. In order to accomplish this the lever 37 is formed as two spaced parallel levers 37a and 37b (see FIGURE 10) and both the casings 22 and 42 have been constructed to provide openings 121 and 122 respecitvely at their adjacent parts to allow the pump and motor cylinder blocks to approach more closely to one another. In FIGURE 9 the motor cylinder block has been omitted in order that the disposition of the lever 37b and the associated link 44 may be more easily appreciated. The pivotal connections at the ends of the levers 37a and 37b to the links 44 and 45 are similar to those shown in FIGURES 1 and 2 except for the fact that two separate bolts 56a and 56b are used to secure the links 44 and 45 to the levers. Another small difference from the embodiment of FIGURES 1 and 2 lies in the fact that the pivotal connections between the links and the motor casing 42 have been altered so that their pivotal axis extends on the opposite side of the motor cylinder block to that on which the pump is located. In fact it may be said that the two levers 37a and 37b and the links 45 and 44 completely embrace the motor cylinder block. As in the embodiment of FIGURES 1 and 2 hydraulic passages exist through the levers and the links to connect hydraulically the pump and the motor together.

We claim as our invention:

1. A hydraulic power transmission comprising a tilting head pump and a tilting head motor hydraulically connected to said pump, the two tilting heads being arranged with their tilt axes in substantially parallel relationship and with the drive shafts of pump and motor non-coaxially arranged, a lever forming part of one of the tilting heads, and a link pivotally connected at spaced positions along its length to the lever and to the other tilting head, whereby adjustment of the pump tilting head about its tilt axis will cause adjustment of the motor tilting head about its tilt axis.

2. A hydraulic power transmission as claimed in claim 1, wherein the motor tilting head lies to one side of a plane which includes the pump drive shaft axis and the pump tilt axis, and the lever forms parts of the pump tilting head, extending towards the motor tilting head.

3. A hydraulic power transmission as claimed in claim 1, wherein the pump and motor drive shafts are disposed in parallel relationship.

4. A hydraulic power transmission as claimed in claim 1, wherein the pump and motor drive shafts are in inclined relationship.

5. A hydraulic power transmission as claimed in claim 1 wherein the drive shafts of the pump and the motor extend in opposite directions.

6. A hydraulic power transmission as claimed in claim 1 wherein two levers extend from the pump tilting head and two links are pivotally connected one to each lever and to the motor tilting head, the link pivots on the levers being co-axial, the link pivots on the motor head being co-axial and each pivotally connected lever and link including a hydraulic passage extending between the pump and the motor.

7. A hydraulic power transmission as defined in claim 1, wherein the pump tilting head is angularly adjustable through a range through and at opposite sides of a dead center position, the link and its pivotal connections being so arranged that at such dead center position the link's pivotal connections are aligned with the pump's tilt axis, thereby to determine the maximum angular movement of the motor tilting head about its tilt axis, and its maximum piston stroke position.

8. A hydraulic power transmission as claimed in claim 7 wherein the dead-centre position coincides with the zero displacement position of the pump.

9. A hydraulic power transmission as claimed in claim 8, including a low-pressure pump mechanically connected for driving with the transmission pump, a servo motor energised by the low-pressure liquid delivered by the low-pressure pump for adjusting the transmission pump and motor displacements, and a spring-loaded latch engageable under spring pressure to lock the pump and motor tilting heads against movement from the pump zero displacement position, the latch being connected with the delivery of the low-pressure pump for removal from latching position by hydraulic delivery from such pump.

10. A hydraulic power transmission as claimed in claim 7 wherein the relative disposition of the tilting head pump and the tilting head motor is such that a plane perpendicular to the pump drive shaft axis will pass through both the pump tilting head and the motor tilting head, and such that a plane perpendicular to the motor drive shaft axis will pass through both the pump tilting head and the motor tilting head.

11. A hydraulic power transmission comprising a tilting head pump and a tilting head motor hydraulically connected to drive the motor from the pump, and each mounted in side-by-side disposition for tilting about parallel tilting axes, a drive shaft for each of the pump and the motor, which by reason of their side-by-side disposition are themselves non-coaxially disposed, a lever forming an integral part of one of the tilting heads, a link pivotally connected at spaced locations along its length to said lever and to the other tilting head, and means to tilt said heads about their tilting axes, the arrangement being such that in the zero displacement position of the pump's tilting head the two connections of the link are aligned with the tilting axis of the pump.

References Cited in the file of this patent
UNITED STATES PATENTS

| | | |
|---|---|---|
| 2,905,150 | Ebert | Sept. 22, 1959 |
| 2,981,068 | Foerster et al. | Apr. 25, 1961 |
| 3,052,098 | Ebert | Sept. 4, 1962 |